United States Patent
Farrar

(10) Patent No.: US 12,267,188 B2
(45) Date of Patent: Apr. 1, 2025

(54) MAGNITUDE EQUALIZATION OF AUDIO-BASED DATA TRANSMISSIONS

(71) Applicant: LISNR, Inc., Cincinnati, OH (US)

(72) Inventor: Rebekah Farrar, Oakland, CA (US)

(73) Assignee: LISNR, INC., Cincinnati, OH (US)

( * ) Notice: Subject to any disclaimer, the term of this patent is extended or adjusted under 35 U.S.C. 154(b) by 0 days.

(21) Appl. No.: 17/756,348

(22) PCT Filed: Nov. 22, 2019

(86) PCT No.: PCT/US2019/062820
§ 371 (c)(1),
(2) Date: May 23, 2022

(87) PCT Pub. No.: WO2021/101570
PCT Pub. Date: May 27, 2021

(65) Prior Publication Data
US 2022/0385503 A1    Dec. 1, 2022

(51) Int. Cl.
*H04L 25/03* (2006.01)
(52) U.S. Cl.
CPC ............................ *H04L 25/03159* (2013.01)
(58) Field of Classification Search
CPC ... H04L 25/03159; H04L 27/38; H04B 11/00; G10L 19/00
See application file for complete search history.

(56) References Cited

U.S. PATENT DOCUMENTS

| | | | |
|---|---|---|---|
| 5,604,771 A | 2/1997 | Quiros | |
| 10,176,815 B1 | 1/2019 | Chmiel et al. | |
| 2001/0003089 A1* | 6/2001 | Kroeger | H04H 20/22 455/45 |
| 2005/0141626 A1* | 6/2005 | Lee | H04L 25/0232 375/340 |
| 2006/0056644 A1 | 3/2006 | Kreifeldt et al. | |
| 2010/0091916 A1 | 4/2010 | Henriksson et al. | |
| 2011/0123039 A1* | 5/2011 | Hirschfeld | H04B 1/082 381/86 |

(Continued)

OTHER PUBLICATIONS

International Search Report and Written Opinion issued in corresponding International application PCT/US19/62820 mailed Feb. 7, 2020.

(Continued)

*Primary Examiner* — Aristocratis Fotakis
(74) *Attorney, Agent, or Firm* — NORTON ROSE FULBRIGHT US LLP

(57) ABSTRACT

Methods and systems are presented for correcting interference to audio transmissions containing data. In one embodiment, a method is presented that includes receiving an audio transmission that includes data modulated onto an audio carrier signal. A first portion of the audio transmission may be detected that includes predetermined frequencies that are produced at predetermined times. The method may further include determining a frequency distribution for the predetermined frequencies and identifying magnitudes of the predetermined frequencies within the frequency distribution. A second portion of the audio transmission may then be equalized according to the magnitudes of the predetermined frequencies.

18 Claims, 6 Drawing Sheets

(56) References Cited

U.S. PATENT DOCUMENTS

| | | | |
|---|---|---|---|
| 2011/0149929 A1* | 6/2011 | Kleider | H04L 27/2613 |
| | | | 370/344 |
| 2012/0039424 A1* | 2/2012 | Ferchland | H04B 1/7073 |
| | | | 375/343 |
| 2012/0134238 A1 | 5/2012 | Surprenant et al. | |
| 2014/0169488 A1* | 6/2014 | Varanese | H04L 27/2602 |
| | | | 375/295 |
| 2014/0211883 A1* | 7/2014 | Chai | H04L 5/0092 |
| | | | 375/296 |
| 2018/0331724 A1* | 11/2018 | Li | H04B 5/00 |
| 2019/0096412 A1 | 3/2019 | Knauer et al. | |

OTHER PUBLICATIONS

European Search Report issued in corresponding European Application No. 19953274.8 dated Jun. 30, 2023.

* cited by examiner

MAGNITUDE EQUALIZATION OF AUDIO-BASED DATA TRANSMISSIONS

CROSS-REFERENCE TO RELATED APPLICATION

This application is a 371 National Application of and claims priority to and the benefit of International Application No. PCT/US2019/062820, filed on Nov. 22, 2019. The contents of the referenced patent application is incorporated into the present application by reference.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another.

SUMMARY

The present disclosure presents new and innovative systems and methods for detecting and correcting interference for audio transmissions. In a first aspect, a method is provided comprising receiving an audio transmission including data modulated onto an audio carrier signal and detecting a first portion of the audio transmission, the first portion including predetermined frequencies that are produced at predetermined times. The method may further include determining a first frequency distribution identifying a power distribution for at least one predetermined frequency of the predetermined frequencies during the first portion of the audio transmission and identifying a magnitude for the at least one predetermined frequency within the first frequency distribution. The method may also include identifying a second portion of the audio transmission, equalizing the second portion of the audio transmission according to the magnitude for the at least one predetermined frequency, and demodulating the second portion of the audio transmission to extract the data.

In a second aspect according to the first aspect, the method further comprises determining that the magnitude for the at least one predetermined frequency occurs at a first time different from a second time of the predetermined times, wherein the second time indicates when the at least one predetermined frequency is expected to occur.

In a third aspect according to the second aspect, the method further includes adjusting timing information for the second portion of the audio transmission based on the difference between the first time and the second time.

In a fourth aspect according to any of the first through third aspects, equalizing the second portion of the audio transmission further comprises determining a second frequency distribution of the second portion of the audio transmission and dividing a magnitude of the at least one predetermined frequency within the second frequency distribution by the magnitudes for the at least one predetermined frequency.

In a fifth aspect according to any of the first through fourth aspects, the magnitude of the at least one predetermined frequency is identified using a frequency filter corresponding to the at least one predetermined frequency.

In a sixth aspect according to the fifth aspect, identifying the magnitude of the at least one predetermined frequency further comprises, for each predetermined frequency, running a corresponding frequency filter over the predetermined time corresponding to the predetermined frequency.

In a seventh aspect according to any of the first through six aspects, the predetermined frequencies include all of the frequencies required to demodulate the second portion of the audio transmission.

In an eighth aspect according to any of the first through seventh aspects, the predetermined frequencies do not include at least a second frequency required to demodulate the second portion of the audio transmission.

In a ninth aspect according to the eighth aspect, the first frequency is higher than the second frequency and the method further comprises: identifying a third frequency of the predetermined frequencies, wherein the third frequency is lower than the second frequency and determining, based on maximum magnitudes of the first frequency and the third frequency, a maximum magnitude corresponding to the second frequency.

In a tenth aspect according to any of the first through ninth aspects, the first portion of the audio transmission is at least one of (i) a preamble of the audio transmission indicating the beginning of the audio transmission and (ii) at least a subset of a header of the audio transmission.

In an eleventh aspect, a system is provided comprising a processor and a memory. The memory may store instructions which, when executed by the processor, cause the processor to receive an audio transmission including data modulated onto an audio carrier signal and detect a first portion of the audio transmission, the first portion including predetermined frequencies that are produced at predetermined times. The memory may store further instructions which, when executed by the processor, cause the processor to determine a first frequency distribution identifying a power distribution for at least one predetermined frequency of the predetermined frequencies during the first portion of the audio transmission and identify a magnitude for the at least one predetermined frequency within the first frequency distribution. The memory may store still further instructions which, when executed by the processor, cause the processor to identify a second portion of the audio transmission, equalize the second portion of the audio transmission according to the magnitude for the at least one predetermined frequency, and demodulate the second portion of the audio transmission to extract the data.

In a twelfth aspect according to the eleventh aspect, the memory stores further instructions which, when executed by the processor, cause the processor to determine that the magnitude for the at least one predetermined frequency occurs at a first time different from a second time of the predetermined times, wherein the second time indicates when the at least one predetermined frequency is expected to occur.

In a thirteenth aspect according to the twelfth aspect, the memory stores further instructions which, when executed by the processor, cause the processor to adjust timing information for the second portion of the audio transmission based on the difference between the first time and the second time.

In a fourteenth aspect according to any of the eleventh through thirteenth aspects, the memory stores further instructions which, when executed by the processor while equalizing the second portion of the audio transmission, cause the processor to determine a second frequency distribution of the second portion of the audio transmission and divide a magnitude of the at least one predetermined frequency within the second frequency distribution by the magnitudes for the at least one predetermined frequency.

In a fifteenth aspect according to any of the eleventh through fourteenth aspects, the magnitude of the at least one predetermined frequency is identified using a frequency filter corresponding to the at least one predetermined frequency.

In a sixteenth aspect according to the fifteenth aspect, the memory stores further instructions which, when executed by the processor while identifying the magnitude of the at least one predetermined frequency, cause the processor to run a corresponding frequency filter over the predetermined time corresponding to the predetermined frequency.

In a seventeenth aspect according to any of the eleventh through sixteenth aspects, the predetermined frequencies include all of the frequencies required to demodulate the second portion of the audio transmission.

In an eighteenth aspect according to any of the eleventh through seventeenth aspects, the predetermined frequencies do not include at least a second frequency required to demodulate the second portion of the audio transmission.

In a nineteenth aspect according to the eighteenth aspect, the first frequency is higher than the second frequency. The memory may also store further instructions which, when executed by the processor, cause the processor to identify a third frequency of the predetermined frequencies, wherein the third frequency is lower than the second frequency and determine, based on maximum magnitudes of the first frequency and the third frequency, a maximum magnitude corresponding to the second frequency.

In a twentieth aspect, a non-transitory, computer-readable medium is provided storing instructions which, when executed by a processor, cause the processor to receive an audio transmission including data modulated onto an audio carrier signal and detect a first portion of the audio transmission, the first portion including predetermined frequencies that are produced at predetermined times. The non-transitory, computer-readable medium is provided may store further instructions which, when executed by a processor, cause the processor to determine a first frequency distribution identifying a power distribution for at least one predetermined frequency of the predetermined frequencies during the first portion of the audio transmission and identify a magnitude for the at least one predetermined frequency within the first frequency distribution. The non-transitory, computer-readable medium is provided may store still further instructions which, when executed by a processor, cause the processor to identify a second portion of the audio transmission, equalize the second portion of the audio transmission according to the magnitude for the at least one predetermined frequency, and demodulate the second portion of the audio transmission to extract the data.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to equalization of audio transmissions that are used to transmit data between computing devices.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
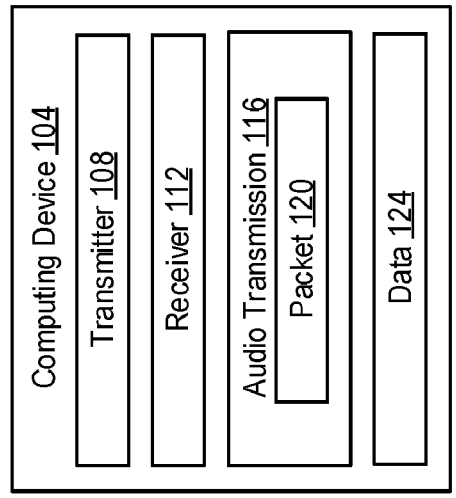
FIG. 1 illustrates a system according to an exemplary embodiment of the present disclosure.
Figure 1:
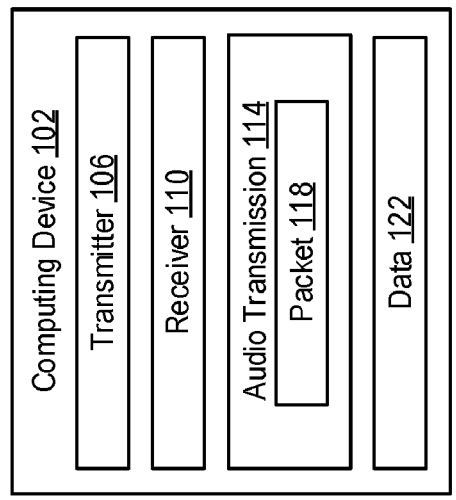

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals)

capable of being processed by a processor of the computing device, such as microphones. In other implementations, the receivers 110, 112 may be implemented as a microphone built into the computing device 102, 104. For example, one or both of the computing devices may be a smart phone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing both a speaker and a microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference that are either not present or less prevalent for data transmissions by electromagnetic signals. For instance, because audio transmissions propagate via sound waves traveling through air, different frequencies may be transmitted differently and/or may propagate differently and may be subject to different types and amounts of interference. In particular, audio transmissions may utilize more than one frequency to modulate and transmit the data. Different frequencies may experience varying rates of attenuation during transmission between the computing devices. This attenuation may be caused by, e.g., environmental factors (e.g., attenuation during propagation through the environment) and transmission factors (e.g., attenuation caused by the transmitter while transmitting the audio transmission). Also, higher frequencies may have greater directionality than lower frequencies. The directionality may cause the magnitude of certain frequencies to change depending on the location of a computing device receiving an audio transmission relative to a computing device transmitting an audio transmission. Different frequencies can also be delayed or advanced differently during propagation, which may cause different portions of an audio transmission that utilize different frequencies to arrive out of sequence or with inconsistent time gaps.

Therefore, there exists a need to identify and correct these types of frequency-dependent interference for audio transmissions. One solution to this problem is to generate the audio transmission to include a portion with known frequencies that occur at known times. Then, a computing device that receives the audio transmission can identify the portion of the audio transmission and compute a frequency distribution of the portion of the audio transmission. Based on the frequency distribution, maximum magnitudes can be determined for each of the known frequencies of the portion of the audio transmission. The maximum magnitudes can be used to equalize the remaining portions of the audio transmission. The equalization can then adjust the magnitude of differently-attenuated frequencies to normalize the frequencies. For example, the equalization may increase the relative magnitude of highly-attenuated frequencies and may decrease the relative magnitude of less-attenuated frequencies. The computing device that receives the audio transmission can also compare the received time for each of the known frequencies to a known time for each of the known frequencies. Based on the comparison, time errors for each of the known frequencies can be determined. These delays can then be applied to the frequencies within the remaining portions of the audio transmission, restoring the proper sequencing and timing information for the audio transmission. In this way, the computing device that receives the audio transmission can properly account for both magnitude and time delays of received audio transmissions. Furthermore, because the correction is performed by the computing device receiving an audio transmission, these techniques can account for sources of interference that change according to the location of the computing device receiving the audio transmission (e.g., interference caused by the location of the computing device receiving an audio transmission and/or interference caused by the environment between the computing device receiving the audio transmission and a computing device transmitting the audio transmission) without requiring special processing by the computing device that transmits the audio transmission.

Figure 2:
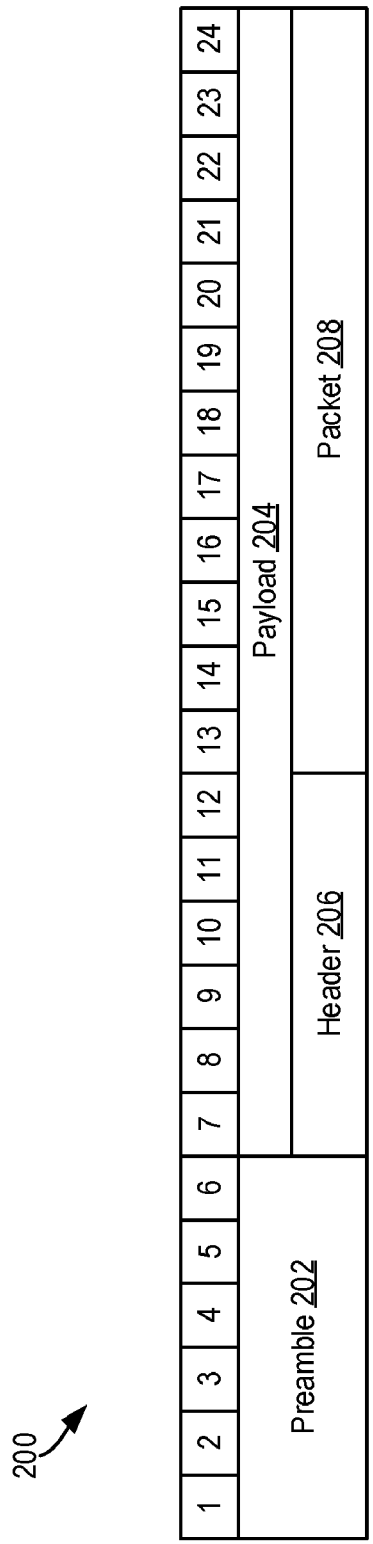
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 5 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined frequencies produced at predetermined points of time (e.g., according to a frequency pattern). In certain implementations, the preamble 202 may additionally or alternatively contain frequencies (e.g., a particular predetermined frequency) whose phase differences are altered by predetermined amounts at predetermined points of time (e.g., according to a phase difference pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding frequencies). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3:
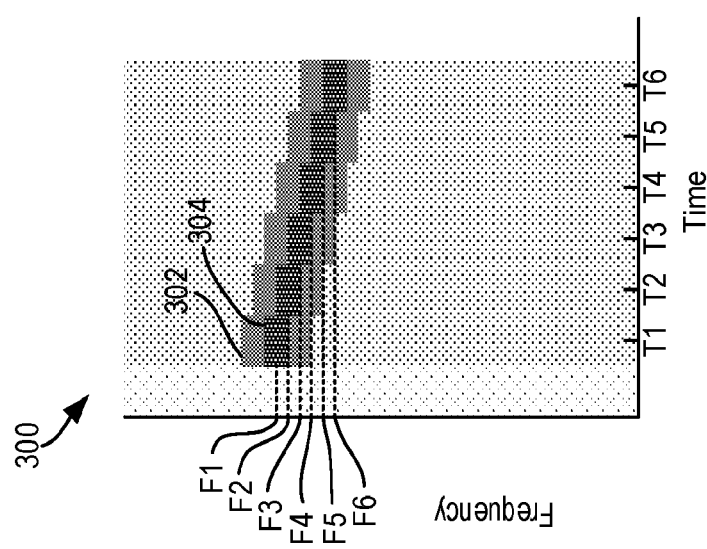
FIG. 3 illustrates a spectrogram of a preamble according to an exemplary embodiment of the present disclosure.

FIG. 3 illustrates a spectrogram 300 of a preamble according to an exemplary embodiment of the present disclosure. Referring to FIG. 2, the preamble may correspond to a preamble 202 of an audio transmission 200 transmitted by a computing device (e.g., before transmission by the computing device). The spectrogram 300 indicates the relative power distribution between frequencies at multiple times T1-T6 within a received audio transmission (e.g., within the preamble of a received audio transmission). The times T1-T6 may correspond to symbols of a received audio transmission. For example, and referring again to FIG. 2, the times T1-T6 may correspond to the symbols 1-6 of the preamble 202. When an audio transmission is initially transmitted, each time T1-T6 may have a corresponding, predetermined frequency. The spectrogram indicates these frequencies F1-F6 at times T1-T6 corresponding to the symbols 1-6. In particular, the times T1-T6 may have a corresponding frequency range 304 with high power concentration and a frequency range 302 with medium or low power concentration. The frequency F1-F6 corresponding to each time T1-T6 may be identified based on the frequency range 304 with high power concentration at each time T1-T6. For example, as illustrated, the frequencies F1-F6 corresponding to each time T1-T6 may be identified as the frequencies F1-F6 located in the middle of the frequency ranges 304 with high power concentration. Additionally or alternatively, the frequencies F1-F6 may be identified as the frequency with the highest power concentration within the frequency range 304 for each time T1-T6. Only one instance of the frequency range 304 and one instance of the frequency range 302 are numbered at time T1, but it should be understood that references to either frequency range 302, 304 herein refer to all such frequency ranges for the other times T2-T6.

As depicted, the preamble includes six predetermined frequencies F1-F6 that decrease in frequency from time T1 to time T6. However, other configurations may include additional or fewer predetermined frequencies. Further, the predetermined frequencies may follow alternative patterns. In particular, other implementations may include predetermined frequencies that increase in frequency over time, or that follow any other pattern or progression over time.

In certain implementations, rather than being implemented as separate, predetermined frequencies F1-F6, the preamble may instead be implemented as a continuous frequency sweep (e.g., a frequency sweep from a starting frequency to an ending frequency, or a frequency sweep following a predetermined pattern). In such implementations, the times T1-T6 may not correspond to individual symbols of the audio transmission 200. Additionally, because the preamble is implemented as a continuous frequency sweep, the times T1-T6 may not have individual corresponding frequencies. Rather, the frequencies F1-F6 may be determined as the strongest frequency at each time T1-T6 (e.g., at a time period surrounding the times T1-T6). For example, the frequencies F1-F6 may be identified (e.g., after the audio transmission is received) as the frequencies F1-F6 with the largest magnitude in the frequency range 304 at each time T1-T6. Additional or alternative implementations may alter the number of times T1-T6 for which frequencies are identified (e.g., four time period and four frequencies) and/or may alter the length of the preamble. In still further implementations, the plot 300 may depict a portion of an audio transmission other than the preamble of the audio transmission. For example, the plot 300 may instead correspond to a portion of the header of the audio transmission, such as the beginning six symbols of the header.

Figure 4:
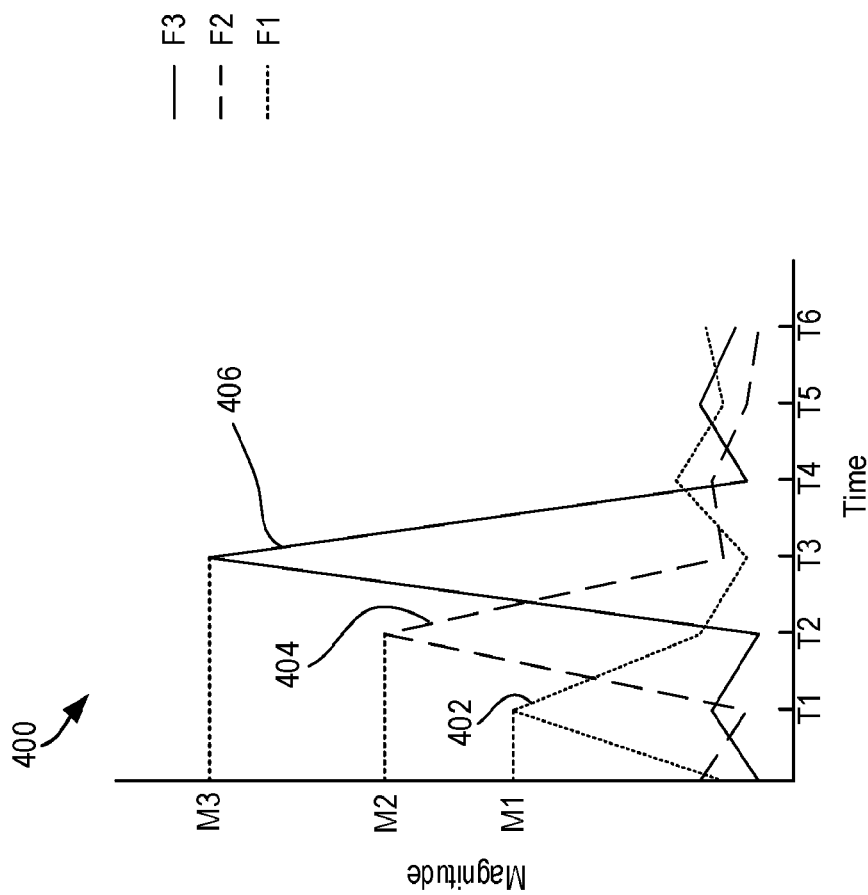
FIG. 4 illustrates a frequency magnitude plot of a portion of a received audio transmission according to an exemplary embodiment of the present disclosure.

To account for the various sources of interference affecting the audio transmissions, computing devices receiving audio transmissions may first determine the extent to which such interference has affected audio transmissions that have been received. To do so, computing devices receiving audio transmissions may, upon detecting the preamble of a received audio transmission, calculate a frequency distribution of the preamble. FIG. 4 illustrates a frequency magnitude plot 400 of a portion of a received audio transmission according to an exemplary embodiment of the present disclosure. In particular, the frequency magnitude plot 400 may depict power distributions of frequencies F1-F3 of the preamble or other portion of a received audio transmission (e.g., a portion that was originally transmitted to have the characteristics discussed above regarding FIG. 3).

The frequency magnitude plot 400 depicts power distributions at times T1-T6 for the frequencies F1-F3 of the preamble of the received audio transmission. In particular, the line 402 depicts the power distribution of frequency F1, the line 404 depicts the power distribution of frequency F2, and the line 406 depicts the power distribution of frequency F3. Although not depicted for clarity, similar power distributions may also be determined for frequencies F4-F6 of the preamble. As can be seen, frequency F1 has a maximum magnitude M1 at time T1, frequency F2 has a maximum magnitude M2 at time T2, and frequency F3 has a maximum magnitude M3 at time T3. The maximum magnitude M1 of frequency F1 is less than the maximum magnitude M2 of frequency F2, which is less than the maximum magnitude M3 of frequency F3. This may be caused by sources of interference that interfere differently with sound waves of different frequencies and/or caused by different transmitting characteristics at different frequencies for a transmitter transmitting the audio transmission including the preamble. For example, higher frequencies may attenuate more than lower frequencies and/or may be transmitted by a transmitter with lower magnitudes than lower frequencies. With reference to FIG. 3, frequency F1 is higher than frequencies F2, F3 and may therefore attenuate more than the frequencies F2, F3, resulting in a lower maximum magnitude M1 lower than the maximum magnitudes M2, M3. Frequency F2 is higher than frequency F3 and may therefore attenuate more than the frequency F3, resulting in a maximum magnitude M2 lower than the maximum magnitude M3.

The sources of interference may interfere similarly with both the preamble and the remaining portions of an audio transmission. Therefore, the attenuation of the preamble can be used as an indication of the attenuation of the remainder of the audio transmission and therefore to correct the audio transmission. For example, to normalize the relative magnitudes of the frequencies F1-F3, occurrences of the frequencies F1-F3 within the audio transmission may be divided by the corresponding maximum magnitudes M1-M3 in the preamble. In certain implementations, other types of magnitudes may be utilized to normalize the relative magnitudes of the frequencies F1-F3. For example, occurrences of the frequencies F1-F3 within the audio transmission may be divided by the average magnitudes of the power distributions associated with each frequency.

The times at which the maximum magnitudes M1-M3 of the power distributions for each of the frequencies F1-F3 occur may also be compared to expected times at which the maximum magnitudes M1-M3 will occur. In particular, interference during transmission of the audio transmission may cause one or more of the predetermined frequencies to be delayed. Therefore, the relative timing of the maximum magnitude M1-M3 of each frequency F1-F3 may differ depending on the frequency F1-F3. In particular, certain frequencies F1-F3 may arrive out of sequence (e.g., later or earlier than expected as compared to other frequencies F1-F3). A computing device receiving the audio transmission may therefore compare the time at which the maximum magnitude M1-M3 of each frequency F1-F3 occurs to an expected time of the maximum magnitude for the frequency occurring. The expected time may be determined based on the time of receipt of the audio transmission and/or the time at which a preamble of the audio transmission begins. If the computing device detects a difference between the time at which a maximum magnitude M1-M3 of a frequency F1-F3 occurs and a time at which the maximum magnitude M1-M3 of the frequency F1-F3 is expected to occur, the computing device may determine that the frequency is delayed or advanced due to interference and may adjust the processing of the audio transmission to account for the time difference (e.g., by searching for frequencies at delayed or advanced times determined based on the time difference) and/or correct the time difference within the audio transmission.

The power distributions of the frequencies F1-F3 may be calculated at each time by a frequency filter corresponding to the frequencies F1-F3. For example, a separate filter may be used to calculate the power distribution for each of the frequencies F1-F3. In particular, the frequency filter for each frequency may be implemented as a corresponding Goertzel filter configured to determine the power distribution of the frequencies F1-F3 at each time T1-T6. In additional or alternative implementations, other techniques may be used, such as performing Fourier Transforms (e.g., Fast Fourier Transforms) for the signals at each time T1-T6.

Figure 5B:
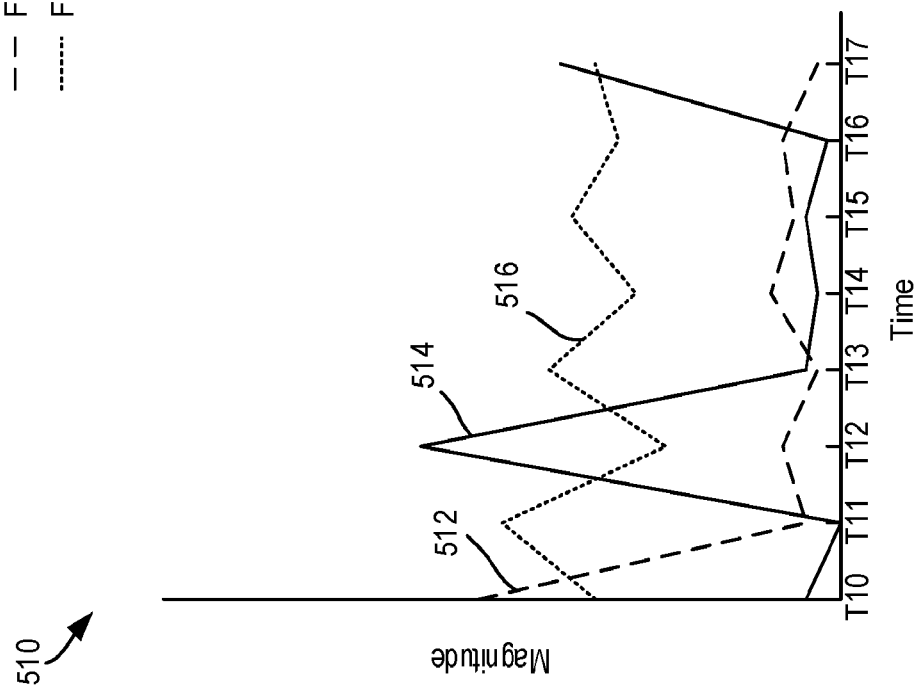
FIGS. 5A-5B illustrate frequency magnitude plots of an audio transmission according to an exemplary embodiment of the present disclosure.
Figure 5A:
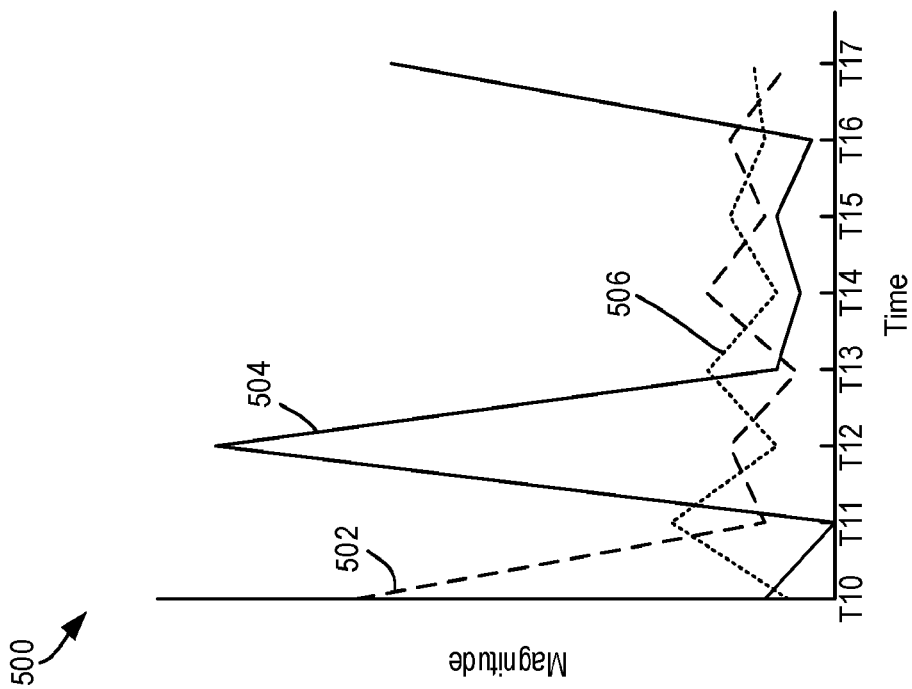

FIGS. 5A-5B illustrate frequency magnitude plots 500, 510 of an audio transmission according to an exemplary embodiment of the present disclosure. The frequency magnitude plots 500, 510 may depict equalization of another portion of a received audio transmission based on the preamble of the received audio transmission. In particular, and with reference to FIG. 3, the frequency magnitude plots 500, 510 may depict equalization of a different portion of a received audio transmission based on maximum magnitudes M1-M3 of frequencies F1-F3 of the preamble or another portion of the received audio transmission. For example, the frequency magnitude plot 500 may correspond to a different portion of the audio transmission before equalization, while the frequency plot 510 may correspond to the different portion of the audio transmission after equalization.

The frequency magnitude plots 500, 510 depict power distributions of the frequencies at times T10-T17. Referring to FIG. 2, the times T10-T17 may correspond to symbols S10-S17 of a payload 204 of a received audio transmission 200. Returning to FIG. 5, line 502 depicts the power distribution of frequency F2, line 504 depicts the power distribution of frequency F3, and line 506 depicts the power distribution of frequency F1. The line 506 has smaller magnitudes when compared to lines 502, 504. As explained above in connection with FIG. 4, the smaller magnitudes may result from comparatively higher interference for frequency F1, which is higher than frequencies F2, F3 and may therefore attenuate more. This type of interference may reduce the quality of the received audio transmission. For example, at time T11, frequency F1 is the strongest received frequency, but is only slightly higher than frequency F2 at time T11. By contrast, at time T10, the frequency F2 is the strongest received frequency and has a power much higher than the other frequencies F1, F3. Similarly, at times T12, T17, the frequency F3 is the strongest received frequency and has a power much higher than the other frequencies F1, F2. Subsequent processing may assume that the strongest received frequency at times T10-T17 is much higher (e.g., two or three times higher) than other frequencies. Therefore, the comparatively lower magnitude of frequency F1 at time T11 may cause errors in subsequent processing of the received audio transmission. This problem similarly occurs at times T13-T16, where frequencies F1-F3 all have relatively low magnitudes.

To correct this type of interference, a computing device receiving the audio transmission may normalize the power distributions of the frequencies F1-F3 based on the preamble or other portion. For example, and referring to FIG. 4, the computing device may normalize the power distributions of the frequencies F1-F3 based on maximum magnitudes M1-M3 of the frequencies F1-F3 in the preamble of the audio transmission. In particular, the computing device may divide the magnitude of the power distribution for each frequency F1-F3 by the corresponding maximum magnitude M1-M3 at each time T10-T17.

The frequency distribution plot 510 depicts equalized power distributions of the frequencies F1-F3 for the times T10-T17. In particular, line 512 depicts the equalized power distribution of frequency F2, the line 514 depicts the equalized power distribution of frequency F3, and the line 516 depicts the equalized power distribution of frequency F1. As illustrated, the maximum magnitudes of the equalized power distributions of the frequencies F1-F3 are closer in magnitude than in the frequency distribution plot 500. For example, at time T11, the magnitude of frequency F1 is much higher than the magnitudes of the frequencies F1, F3. Also, at times T13-T16, line 516 is now clearly higher than lines 512, 514, indicating that the frequency F1 was transmitted with the strongest magnitude. As explained above, the increase in the magnitude of frequency F1 relative to the other frequencies F2, F3 may improve further processing of the audio transmission. Also, at time T14 in the frequency distribution plot 500, the magnitude of frequency F1 is lower than the magnitude of the other frequencies F2, F3. However, once equalized in the frequency plot 510, the magnitude of frequency F1 is higher than the magnitude of the other frequencies F2, F3. Accordingly, such normalization may help account for interference that attenuates certain frequencies more, causing the frequencies to have smaller magnitudes when received than other frequencies, even when the attenuated frequencies are the strongest when transmitted.

Figure 6:
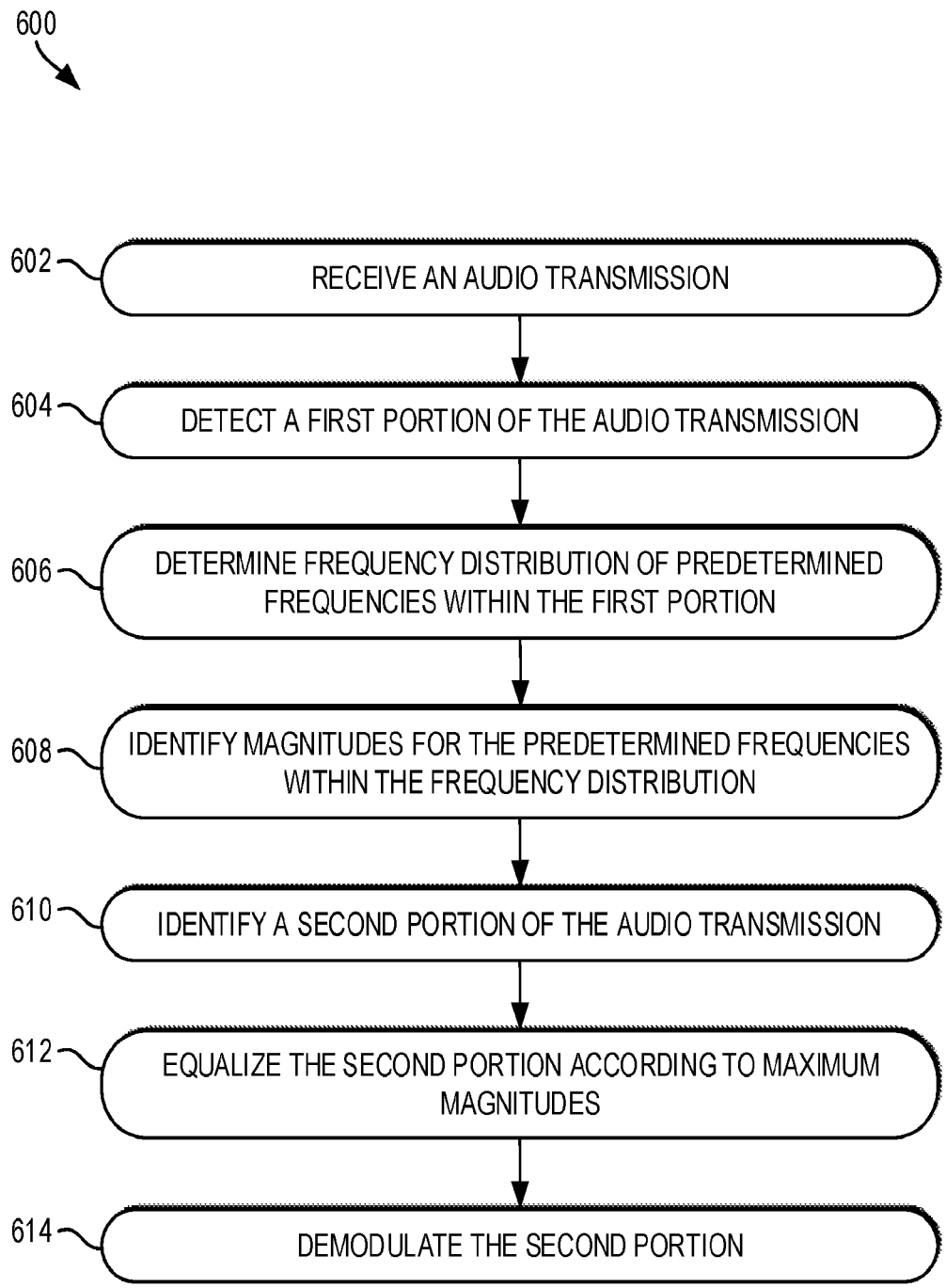
FIG. 6 illustrates a method according to an exemplary embodiment of the present disclosure.

FIG. 6 illustrates a method 600 according to an exemplary embodiment of the present disclosure. The method 600 may be performed to process a received audio transmission. The method 600 may be implemented on a computer system, such as the system 100. For example, the method 600 may be implemented by a computing device 102, 104. The method 600 may also be implemented by a set of instructions stored on a computer readable medium that, when executed by a processor, cause the computer system to perform the method. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 begins with receiving an audio transmission (block 602). For example, and referring to FIG. 1, a computing device 102, 104 may receive an audio transmission 114, 116 at a receiver 110, 112. Returning to FIG. 6, a first portion of the audio transmission may then be identified (block 604). The first portion of the audio transmission may include one or more predetermined frequencies that are produced at predetermined times or in a predetermined order. In certain implementations, the first portion may be detected at the beginning of an audio transmission. For example, the first portion of an audio transmission may be identified as the preamble of the audio transmission, as discussed above. In other implementations, the first portion may occur in another portion of the audio transmission (e.g., the beginning of a header of the audio transmission). For example, the first portion may be identified as a training sequence of frequencies that occurs after the preamble. In another example, the training sequence may occur in still further portions of the audio transmission, such as at the end of the audio transmission or in the middle of the transmission. The training sequence may include predetermined frequencies occurring at predetermined times, similar to the preamble discussed above in connection with FIG. 3. In certain implementations, training sequences of predetermined frequencies may be preferable to using the preamble of an audio transmission because training sequences may be configured to include additional frequencies. For example, where the predetermined frequencies of the preamble includes only a subset of the frequencies used to modulate data in the audio transmission, a training sequence may be included in the audio transmission to include all of the frequencies used to modulate data in the audio transmission, or a larger subset of the frequencies used to modulate data in the audio transmission. In further implementations, the audio transmission may not include a preamble or may include a preamble that does not includes multiple predetermined frequencies. In such implementations, a training sequence may be included with at least a subset of the frequencies used to modulate data for the audio transmission.

A frequency distribution of the first portion may then be determined (block 606). The frequency distribution may be calculated for predetermined frequencies that the first portion is generated to include. For example, and referring to FIG. 4, where the first portion is the preamble of the audio transmission, a frequency distribution 400 may be generated to include power distribution of frequencies F1-F3 included within the preamble. As explained above, the frequency distribution 400 may be generated using one or more frequency filters. In particular, separate power distributions may be calculated for each frequency F1-F3, as indicated by the lines 402, 404, 406. Returning to FIG. 6, magnitudes may then be identified for the predetermined frequencies (block 608). For example, and referring to FIG. 3, the computing device 102, 104 that received the audio transmission may identify, for each predetermined frequency F1-F3, of the first portion of the audio transmission, a maximum magnitude M1-M3 within a power distribution corresponding to the predetermined frequency F1-F3 (e.g., indicated by the lines 402, 404, 406).

A second portion of the audio transmission may then be identified (block 610). The second portion of the audio transmission may be identified as a portion of the audio transmission other than the first portion identified at block 604. For example, the second portion of the audio transmission may include one or more of a payload, header, and/or packet included within the audio transmission. The second portion may then be equalized according to the maximum magnitudes of the predetermined frequencies (block 612). For example, and referring again to FIG. 4, the computing unit may equalize the second portion of the audio transmission using the maximum magnitudes M1-M3 of the power distributions of the predetermined frequencies F1-F3 within the preamble of the audio transmission that is received. As further shown in FIGS. 5A-5B, equalizing the second portion of the audio transmission may increase the magnitude of the power distributions of certain frequencies F1 relative to other frequencies F2, F3 and may decrease the magnitude of the power distributions of still further frequencies F3 relative to other frequencies F1, F2. Equalizing the second portion of the audio transmission may increase the accuracy of subsequent processing of the second portion by increasing the difference in magnitude of the strongest frequency at each time within the second portion, making it clearer which frequency is the strongest at each time.

In certain implementations, the second portion of the audio transmission may utilize frequencies to modulate transmitted data that differ at least in part from the predetermined frequencies of the first portion of the audio transmission. For example, the second portion may modulate transmitted data using a frequency that is between two predetermined frequencies. In such instances, the frequencies that differ from the predetermined frequencies may be equalized using magnitudes interpolated from the maximum magnitudes of the predetermined frequencies. Continuing the previous example, the frequency that is between two predetermined frequencies may be equalized using a magnitude interpolated from the magnitudes associated with the two predetermined frequencies (e.g., a weight calculated as an average of the maximum magnitudes associated with the two predetermined frequencies).

Other strategies may also be used to equalize the second portion of the audio transmission based on the maximum magnitudes of the predetermined frequencies within the first portion of the audio transmission. For example, a trend may be determined between the maximum magnitudes of the predetermined frequencies within the first portion of the audio transmission. The second portion of the audio transmission may then be normalized using magnitudes identified based on the trend. For example, for each frequency used to transmit data within the second portion of the audio transmission, the computing unit may identify a corresponding magnitude from the trend and may use the identified magnitude to equalize the magnitudes of occurrences of the frequency within the second portion of the audio transmission.

In addition to equalizing the second portion of the audio transmission, one or more frequency-dependent time errors may be detected and corrected. For example, as discussed above in connection with FIG. 4, the time at which a maximum magnitude for each of the predetermined frequencies occurs in the first portion may be compared to an expected time of occurrence for each of the predetermined frequencies. If a difference is detected between the time of occurrence and expected time of occurrence, a time error may be detected. In addition to equalizing the second portion, timing information associated with predetermined frequencies having a time error may be adjusted to account for the time error. For example, if the time error indicates that the maximum magnitude of a first frequency occurred later than expected by 0.2 milliseconds, timing information associated with the first frequency may be adjusted to occur 0.2 milliseconds earlier in the second portion of the audio transmission, or occurrences of the first frequency may be searched for 0.2 milliseconds later than expected. As another example, if the time error indicates that the maximum magnitude of a second frequency occurred earlier than expected by 0.5 milliseconds, timing information associated with the second frequency may be adjusted to occur 0.5 milliseconds later in the second portion of the audio transmission, or occurrences of the second frequency may be searched for 0.5 milliseconds earlier than expected.

The second portion of the audio transmission may then be demodulated (block 614). For example, the computing unit that received the audio transmission may demodulate the second portion of the audio transmission that was equalized at block 612 to extract data (e.g., a header and/or packet) from the audio transmission. The demodulated second portion of the audio transmission may then be subsequently processed according to one or more applications or other purposes (e.g., to process a payment, determine a device location, exchange information).

The method 600 may be performed to equalize portions of received audio transmissions prior to demodulation. Equalizing these portions of the audio transmission may account for or otherwise minimize the effects of interference that can affect different frequency components of the audio transmissions and thereby improve the accuracy of data extracted from the audio transmissions. Accordingly, the method 600 may improve the accuracy of data transmitted by audio, which can lead to further operational benefits. For example, by improving accuracy of data extracted from audio transmissions, the method 600 may reduce the number of audio transmissions that have to be repeated in response to interference rendering received audio transmissions inaccurate. As another example, by improving accuracy, the method 600 may reduce the error checking processes and mechanisms that are required. In particular, the increased accuracy may reduce the necessity of including additional error checking mechanisms (e.g., checksum digits, parity bits) in the audio transmission, reducing overhead for the audio transmissions and freeing additional symbols within the audio transmission for increased data throughput.

In certain implementations, the method 600 may be performed at least in part to equalize more than one audio transmission. For example, a first computing device may receive multiple audio transmissions from a second computing device, and only one of the audio transmissions may include the first portion with predetermined frequencies (e.g., a "training sequence"). Blocks 604-608 may be performed on the audio transmission including the training sequence to identify the magnitudes of the predetermined frequencies. Blocks 610-614 may then be repeated to process the audio transmissions (e.g., to equalize and demodulate the payload of each of the audio transmissions received from the second computing device). Such configurations may reduce the overhead required to detect and correct frequency-dependent interference with the audio transmission.

Figure 7:
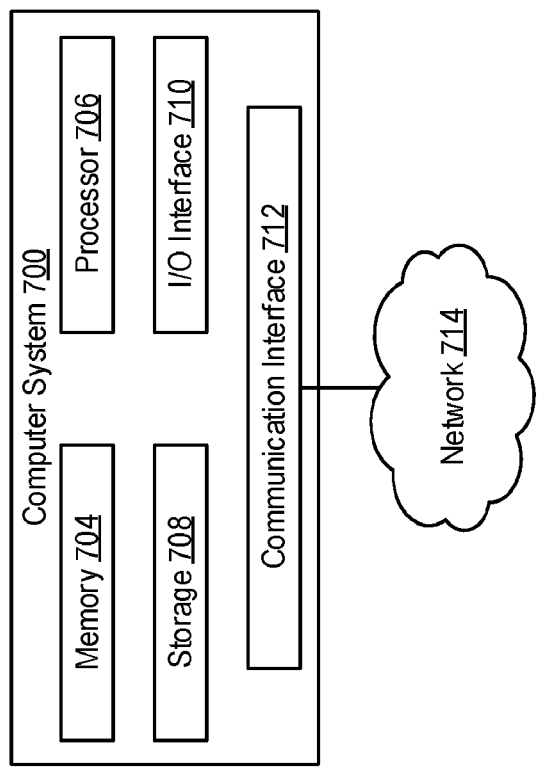
FIG. 7 illustrates a computing system according to an exemplary embodiment of the present disclosure.

FIG. 7 illustrates an example computer system 700 that may be utilized to implement one or more of the devices and/or components of FIG. 1, such as the computing devices 102, 104. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates the computer system 700 taking any suitable physical form. As example and not by way of limitation, the computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 706, memory 704, storage 708, an input/output (I/O) interface 710, and a communication interface 712. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 706 includes hardware for executing instructions, such as those making up a computer program. As an example and not by way of limitation, to execute instructions, the processor 706 may retrieve (or fetch) the instructions from an internal register, an internal cache, memory 704, or storage 708; decode and execute the instructions; and then write one or more results to an internal register, internal cache, memory 704, or storage 708. In particular embodiments, the processor 706 may include one or more internal caches for data, instructions, or addresses. This disclosure contemplates the processor 706 including any suitable number of any suitable internal caches, where appropriate. As an example and not by way of limitation, the processor 706 may include one or more instruction caches, one or more data caches, and one or more translation lookaside buffers (TLBs). Instructions in the instruction caches may be copies of instructions in memory 704 or storage 708, and the instruction caches may speed up retrieval of those instructions by the processor 706. Data in the data caches may be copies of data in memory 704 or storage 708 that are to be operated on by computer instructions; the results of previous instructions executed by the processor 706 that are accessible to subsequent instructions or for writing to memory 704 or storage 708; or any other suitable data. The data caches may speed up read or write operations by the processor 706. The TLBs may speed up virtual-address translation for the processor 706. In particular embodiments, processor 706 may include one or more internal registers for data, instructions, or addresses. This disclosure contemplates the processor 706 including any suitable number of any suitable internal registers, where appropriate. Where appropriate, the processor 706 may include one or more arithmetic logic units (ALUs), be a multi-core processor, or include one or more processors 706. Although this disclosure describes and illustrates a particular processor, this disclosure contemplates any suitable processor.

In particular embodiments, the memory 704 includes main memory for storing instructions for the processor 706 to execute or data for processor 706 to operate on. As an example, and not by way of limitation, computer system 700 may load instructions from storage 708 or another source (such as another computer system 700) to the memory 704. The processor 706 may then load the instructions from the memory 704 to an internal register or internal cache. To execute the instructions, the processor 706 may retrieve the instructions from the internal register or internal cache and decode them. During or after execution of the instructions, the processor 706 may write one or more results (which may be intermediate or final results) to the internal register or internal cache. The processor 706 may then write one or more of those results to the memory 704. In particular embodiments, the processor 706 executes only instructions in one or more internal registers or internal caches or in memory 704 (as opposed to storage 708 or elsewhere) and operates only on data in one or more internal registers or internal caches or in memory 704 (as opposed to storage 708 or elsewhere). One or more memory buses (which may each include an address bus and a data bus) may couple the processor 706 to the memory 704. The bus may include one or more memory buses, as described in further detail below. In particular embodiments, one or more memory management units (MMUs) reside between the processor 706 and memory 704 and facilitate accesses to the memory 704 requested by the processor 706. In particular embodiments, the memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory implementations, this disclosure contemplates any suitable memory implementation.

In particular embodiments, the storage 708 includes mass storage for data or instructions. As an example and not by way of limitation, the storage 708 may include a hard disk drive (HDD), a floppy disk drive, flash memory, an optical disc, a magneto-optical disc, magnetic tape, or a Universal Serial Bus (USB) drive or a combination of two or more of these. The storage 708 may include removable or non-removable (or fixed) media, where appropriate. The storage 708 may be internal or external to computer system 700, where appropriate. In particular embodiments, the storage 708 is non-volatile, solid-state memory. In particular embodiments, the storage 708 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 708 taking any suitable physical form. The storage 708 may include one or more storage control units facilitating communication between processor 706 and storage 708, where appropriate. Where appropriate, the storage 708 may include one or more storages 708. Although this disclosure describes and illustrates particular storage, this disclosure contemplates any suitable storage.

In particular embodiments, the I/O Interface 710 includes hardware, software, or both, providing one or more interfaces for communication between computer system 700 and one or more I/O devices. The computer system 700 may include one or more of these I/O devices, where appropriate. One or more of these I/O devices may enable communication between a person (i.e., a user) and computer system 700. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 710 may include one or more device or software drivers enabling processor 706 to drive one or more of these I/O devices. The I/O interface 710 may include one or more I/O interfaces 710, where appropriate. Although this disclosure describes and illustrates a particular I/O interface, this disclosure contemplates any suitable I/O interface or combination of I/O interfaces.

In particular embodiments, communication interface 712 includes hardware, software, or both providing one or more interfaces for communication (such as, for example, packet-based communication) between computer system 700 and one or more other computer systems 700 or one or more networks 714. As an example and not by way of limitation, communication interface 712 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 714 and any suitable communication interface 712 for the network 714. As an example and not by way of limitation, the network 714 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 712 for any of these networks, where appropriate. Communication interface 712 may include one or more communication interfaces 712, where appropriate. Although this disclosure describes and illustrates a particular communication interface implementations, this disclosure contemplates any suitable communication interface implementation.

The computer system 702 may also include a bus. The bus may include hardware, software, or both and may communicatively couple the components of the computer system 700 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PC1$e$) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
receiving, at a microphone, an audio transmission including data modulated onto an audio signal;
identifying a first portion of the audio transmission, the first portion including predetermined frequencies that are produced at predetermined times;
determining a first frequency distribution identifying a power distribution for at least one predetermined frequency of the predetermined frequencies during the first portion of the audio transmission;
identifying a magnitude for the at least one predetermined frequency within the first frequency distribution;
identifying a second portion of the audio transmission;
equalizing the second portion of the audio transmission according to the magnitude for the at least one predetermined frequency comprising:
 determining a second frequency distribution of the second portion of the audio transmission; and
 dividing a magnitude of the at least one predetermined frequency within the second frequency distribution by the magnitude for the at least one predetermined frequency within the first frequency distribution, and
demodulating the second portion of the audio transmission to extract the data.

2. The method of claim 1, further comprising:
determining that the magnitude for the at least one predetermined frequency within the first frequency distribution occurs at a first time different from a second time of the predetermined times, wherein the second time indicates when the at least one predetermined frequency is expected to occur.

3. The method of claim 2, further comprising:
adjusting timing information for the second portion of the audio transmission based on the difference between the first time and the second time.

4. The method of claim 1, wherein the magnitude of the at least one predetermined frequency within the first frequency distribution is identified using a frequency filter corresponding to the at least one predetermined frequency.

5. The method of claim 4, wherein identifying the magnitude of the at least one predetermined frequency further comprises, for each predetermined frequency, running a corresponding frequency filter over the predetermined time corresponding to the predetermined frequency.

6. The method of claim 1, wherein the predetermined frequencies include all of the frequencies required to demodulate the second portion of the audio transmission.

7. The method of claim 1, wherein the predetermined frequencies do not include at least a second frequency required to demodulate the second portion of the audio transmission.

8. The method of claim 7, wherein the first frequency is higher than the second frequency and the method further comprises:
identifying a third frequency of the predetermined frequencies, wherein the third frequency is lower than the second frequency; and
determining, based on maximum magnitudes of the first frequency and the third frequency, a maximum magnitude corresponding to the second frequency.

9. The method of claim 1, wherein the first portion of the audio transmission is at least one of (i) a preamble of the audio transmission indicating the beginning of the audio transmission and (ii) at least a subset of a header of the audio transmission.

10. A system comprising:
a processor; and
a memory storing instructions which, when executed by the processor, cause the processor to:
 receive, at a microphone, an audio transmission including data modulated onto an audio signal;
 detect a first portion of the audio transmission, the first portion including predetermined frequencies that are produced at predetermined times;
 determine a first frequency distribution identifying a power distribution for at least one predetermined frequency of the predetermined frequencies during the first portion of the audio transmission;
 identify a magnitude for the at least one predetermined frequency within the first frequency distribution;
 identify a second portion of the audio transmission;
 equalize the second portion of the audio transmission according to the magnitude for the at least one predetermined frequency;
 wherein the equalizing the second portion of the audio transmission comprises: determine a second frequency distribution of the second portion of the audio transmission; and divide
 a magnitude of the at least one predetermined frequency within the second frequency distribution by the magnitude for the at least one predetermined frequency within the first frequency distribution; and
 demodulate the second portion of the audio transmission to extract the data.

11. The system of claim 10, wherein the memory stores further instructions which, when executed by the processor, cause the processor to:
determining that the magnitude for the at least one predetermined frequency within the first frequency distribution occurs at a first time different from a second time of the predetermined times, wherein the second time indicates when the at least one predetermined frequency is expected to occur.

12. The system of claim 11, wherein the memory stores further instructions which, when executed by the processor, cause the processor to:

adjust timing information for the second portion of the audio transmission based on the difference between the first time and the second time.

13. The system of claim 10, wherein the magnitude of the at least one predetermined frequency within the first frequency distribution is identified using a frequency filter corresponding to the at least one predetermined frequency.

14. The system of claim 13, wherein the memory stores further instructions which, when executed by the processor while identifying the magnitude of the at least one predetermined frequency, cause the processor to:

run a corresponding frequency filter over the predetermined time corresponding to the predetermined frequency.

15. The system of claim 10, wherein the predetermined frequencies include all of the frequencies required to demodulate the second portion of the audio transmission.

16. The system of claim 10, wherein the predetermined frequencies do not include at least a second frequency required to demodulate the second portion of the audio transmission.

17. The system of claim 16, wherein the first frequency is higher than the second frequency and the memory stores further instructions which, when executed by the processor, cause the processor to:

identify a third frequency of the predetermined frequencies, wherein the third frequency is lower than the second frequency; and determine, based on maximum magnitudes of the first frequency and the third frequency, a maximum magnitude corresponding to the second frequency.

18. A non-transitory, computer-readable medium storing instructions which, when executed by a processor, cause the processor to:

receive, at a microphone, an audio transmission including data modulated onto an audio signal;

detect a first portion of the audio transmission, the first portion including predetermined frequencies that are produced at predetermined times;

determine a first frequency distribution identifying a power distribution for at least one predetermined frequency of the predetermined frequencies during the first portion of the audio transmission;

identify a magnitude for the at least one predetermined frequency within the first frequency distribution;

identify a second portion of the audio transmission;

equalize the second portion of the audio transmission according to the magnitude for the at least one predetermined frequency;

wherein the equalizing the second portion of the audio transmission comprises determine a second frequency distribution of the second portion of the audio transmission; and divide a magnitude of the at least one predetermined frequency within the second frequency distribution by the magnitude for the at least one predetermined frequency within the first frequency distribution; and demodulate the second portion of the audio transmission to extract the data.

* * * * *